July 29, 1969    J. N. LAUZON ET AL    3,458,026
ARTICLE SPACER
Original Filed March 28, 1966    3 Sheets-Sheet 1

INVENTORS
JAMES NELSON LAUZON
RAYMOND J. SANDNER
JORGEN S. BILDSOE

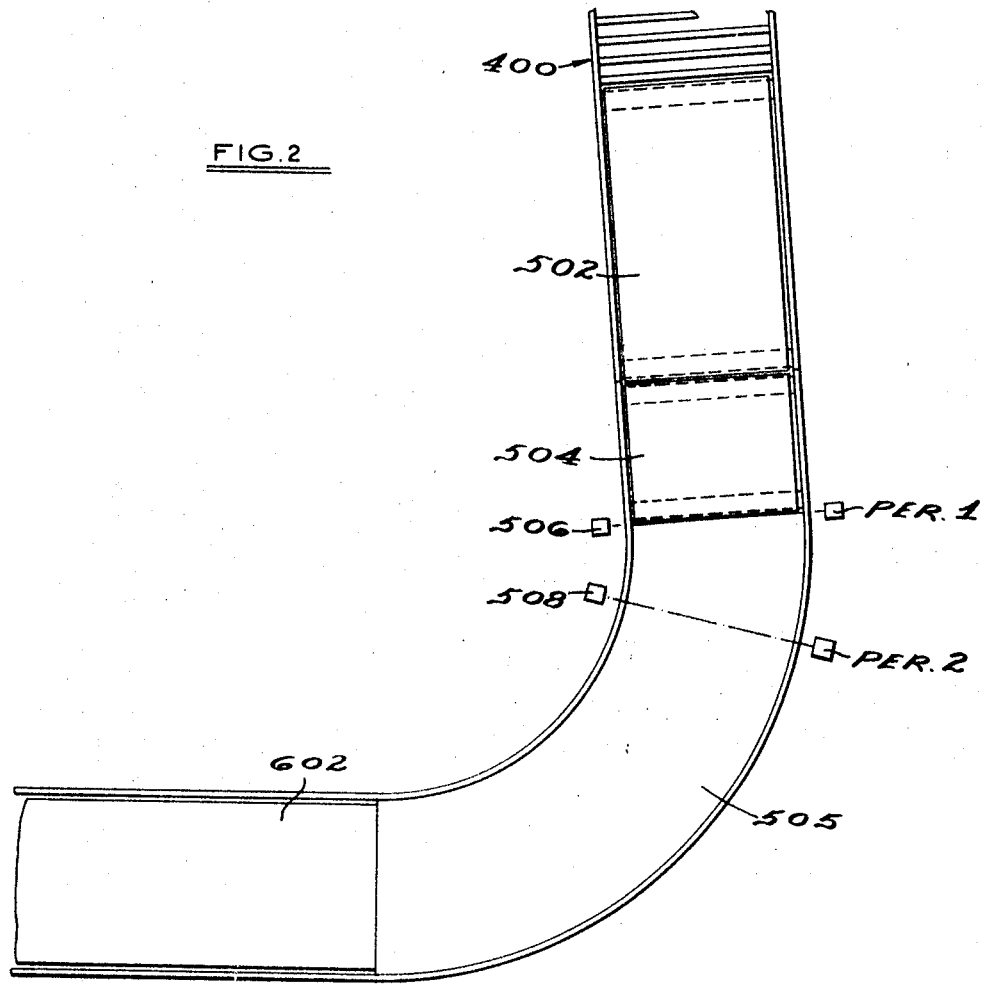
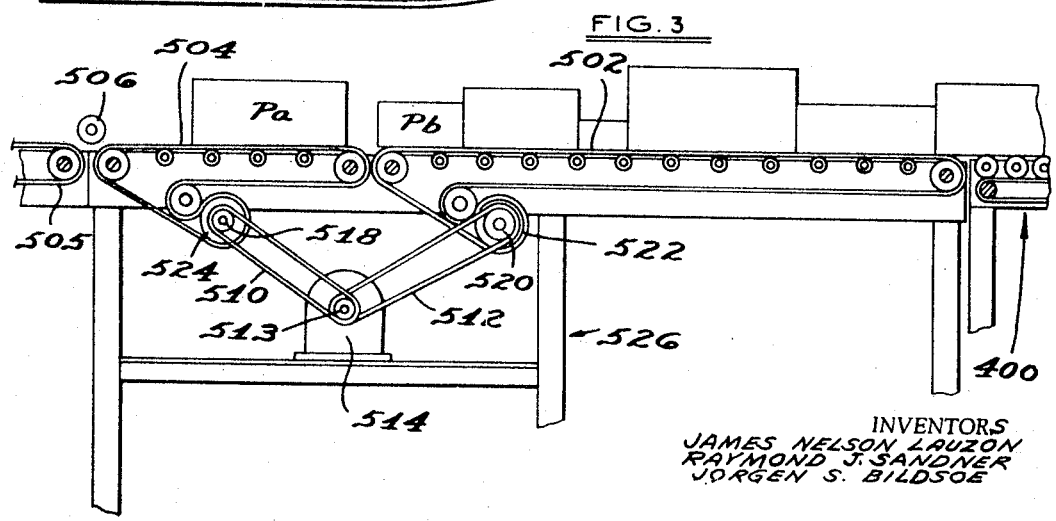

July 29, 1969  J. N. LAUZON ET AL  3,458,026
ARTICLE SPACER
Original Filed March 28, 1966  3 Sheets-Sheet 3

INVENTORS
JAMES NELSON LAUZON
RAYMOND J. SANDNER
JORGEN S. BILDSOE

3,458,026
ARTICLE SPACER

James Nelson Lauzon, East Detroit, Raymond J. Sandner, St. Clair Shores, and Jorgen S. Bildsoe, Royal Oak, Mich., assignors to Taylor & Gaskin, Inc., Detroit, Mich., a corporation of Michigan
Original application Mar. 28, 1966, Ser. No. 538,000, now Patent No. 3,361,247, dated Jan. 2, 1968. Divided and this application Nov. 8, 1967, Ser. No. 706,205
Int. Cl. B65g 47/31
U.S. Cl. 198—34                                                                   1 Claim

ABSTRACT OF THE DISCLOSURE

This disclosure shows an article spacer for spacing apart at least a predetermined minimum distance a succession of articles, which may be of varying sizes, delivered to it in randomly spaced or unspaced relation. The spacer includes a pair of conveyors operable at different speeds to open a discrimination gap between successive articles and a pair of sensors spaced apart a distance related to that of the spacing to be achieved by the spacer and which are operable to control operation of the conveyors to provide a gap of at least a predetermined distance between articles on the downstream one of such conveyors and a conveyor to which the downstream one of such conveyors discharges.

---

This is a division of U.S. patent application, Ser. No. 538,000, filed Mar. 28, 1966, now Patent No. 3,361,247, to which reference should be made for a description of an article sorting system in which the instant spacer has particular though not exclusive utility.

An object of the invention is the provision of an article spacing unit adapted to receive articles at its tail end and in conjunction with a conveyor to which it delivers articles from its head end space the articles apart, the spacer conveyor including a pair of conveyor sections driven at relatively different speeds with one section adapted to first receive the articles to be spaced and pass them on to a second conveyor operating at a greater speed with the difference in speeds giving rise to a spacing between the articles, and with a control system associated with the conveyor sections to insure proper spacing between articles and adapted to start and stop the first conveyor section in accordance with whether the articles are being properly spaced.

Figure 1:
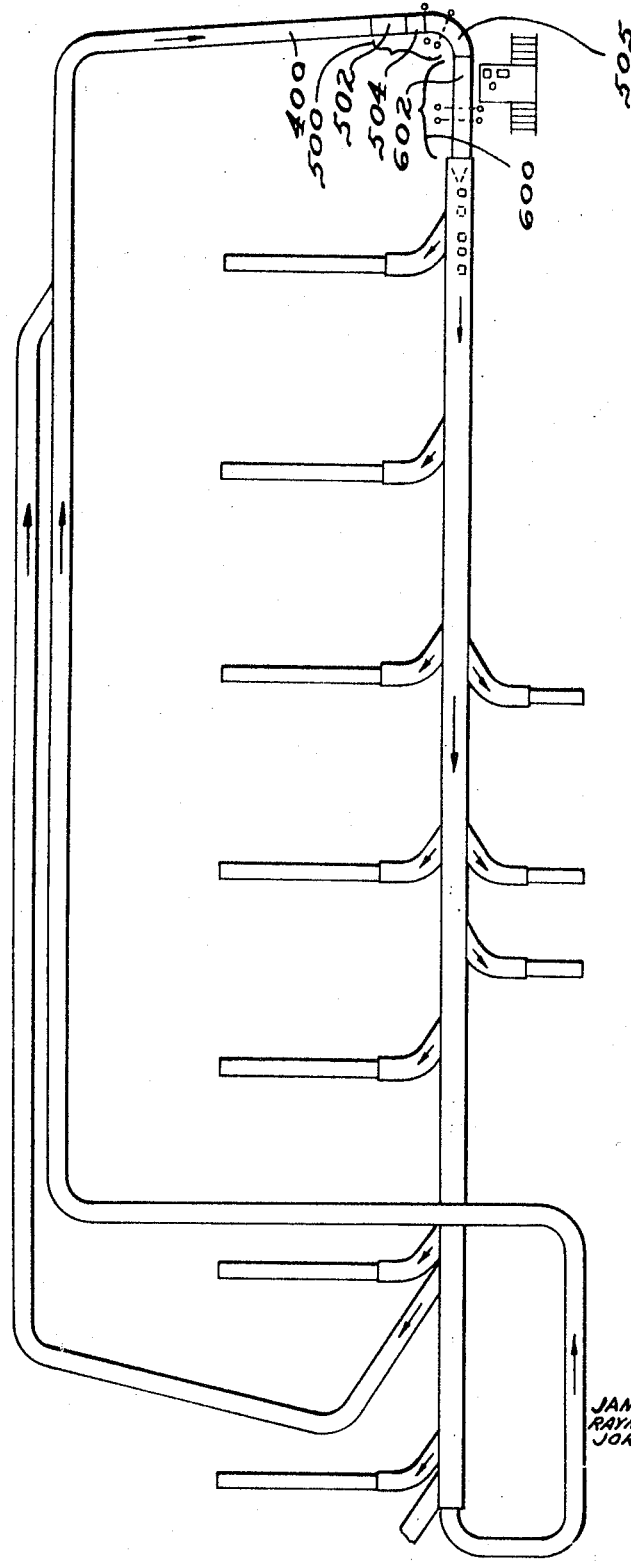
Figure 4:
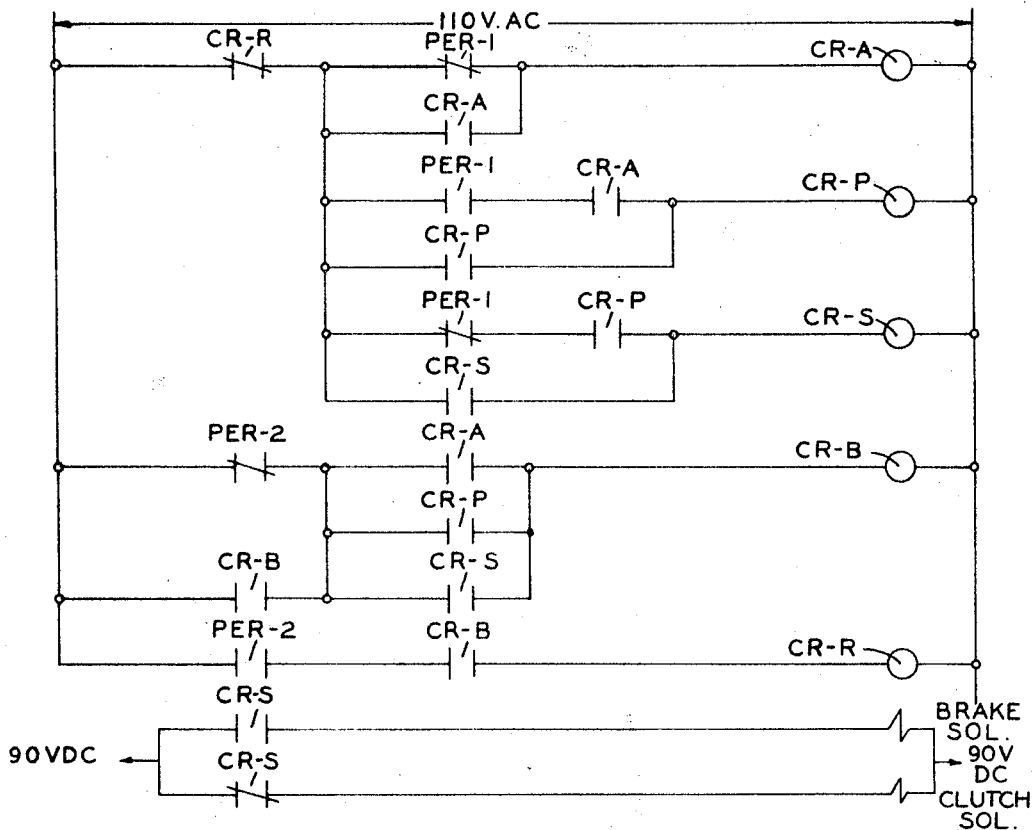

Other objects, advantages and meritorious features will more fully appear from the following specification, claim and accompanying drawings, wherein:

FIG. 1 (sheet 1) is a plan view of an article distributing system including our article spacer;

FIGS. 2 and 3 (sheet 2) are respectively plan and side views of the article spacer system for positively spacing articles prior to entry upon the sorting span; and FIG. 4 (sheet 3) is a schematic wiring diagram of the control system for the spacer.

The spacer 500 shown in FIGS. 1, 2 and 3 may have utility in any conveyor system where it is desired to space apart or insure at least a determined minimum distance between successive articles traveling in either end abutting or randomly spaced relation. The spacer has been designed to be inserted as a unit between the head end of an accumulating conveyor 400 and the tail end of the keying station conveyor 602 and will serve to take articles from the head end of the one and space them, or insure their spacing, at least a predetermined minimum distance apart as they pass onto the tail end of the subsequent conveyor. To carry out the spacing function three conveyor belts are required, two of them comprising what may be termed the spacer conveyor and the third, though essential to the spacing operation, may be a conveyor belt having some function in addition to package spacing; for example, it may be the belt which carries packages through the keying station 600, or in the case of a sorter which diverts packages from only one side, it could be the sorting conveyor itself.

The spacer conveyor includes belts 502 and 504, the latter running faster than the former to open a "peak-a-boo" interval between packages moving from belt 502 to belt 504. The packages move with the "peak-a-boo" interval between them successively to the belt 505 which is a continuously operating belt. Considering FIGS. 2 and 3, as package Pa moves from belt 502 to belt 504 it is accelerated opening a gap between it and succeeding package Pb through which a light beam from lamp 506 may impinge upon electric eye PER 1. Package Pa is then carried on by the conveyor belt 505 to interrupt and pass through the light beam from lamp 508 impinging upon electric eye PER 2. The distance between these light beams determines package spacing effected by the spacer. If package Pa has not cleared the beam from lamp 508 before package Pb interrupts the beam from lamp 506, the belts 502 and 504 are immediately stopped automatically until Pa has cleared the beam from 508 and then the belts are restarted. The belts 502 and 504 are driven by a chain drive 510 and 512 entrained at one end over sprockets 513 of a motor-driven clutch and brake unit schematically shown at 514, and entrained at the opposite end over sprockets 518 and 520 connected to belt drive rolls 522 and 524. We have found that if belt 502 is operated at 110 feet per minute, and belt 504 at 150 feet per minute that very satisfactory spacing operations result. The sprockets are sized to provide the aforementioned belt spaced differential. The motor-driven brake and clutch unit 514 is of conventional construction and need not be described except to explain that it includes an electric motor operating sprockets 513 through an electric clutch with a brake provided to stop the sprockets when the clutch is disengaged. The brake is provided with a solenoid control switch for applying and releasing it, as is the clutch. The belts, and associated mechanism, are supported on a suitable framework 526.

The control system for the spacer is schematically shown in FIG. 4 and operates in the following fashion, it being understood that relay contacts and switches are shown in their normally open or normally closed positions which is their condition when a light beam is being interrupted. As a package interrupts the beam to PER 1, relay CR–A is energized. When the package leaves PER 1, CR–P is energized. This first package is now between light beams impinging upon PER 1 and PER 2. When a second package interrupts the beam impinging on PER 1, this causes an energization of CR–S. When relay CR–S is energized it causes the application of the brake and the release of the clutch. This stops belts 502 and 504 with the result that packages on the spacer conveyor are interrupted in movement. When the first package interrupts the light beam impinging on PER 2, the relay CR–B is energized. As the first package clears the beam, PER 2 energizes CR–R which in turn de-energizes relays CR–A, CR–P and CR–S. Relay CR–S causes a release of the brake and application of the clutch to start the belts 502 and 504 moving with the result that the second package follows the first with a gap therebetween determined by the distance between the beams. When relays CR–A, CR–P and CR–S are de-energized, relay CR–B is also de-energized which in turn de-energizes relay CR–R. The cycle is now ready to repeat. Of course if the packages are spaced farther apart than said gap as they enter upon the belt 505, the spacer belts 502 and 504 will not stop as will be evident from a study of FIG. 4.

For maximum efficiency of operation conveyor 400 should be operated at substantially the same speed as belt 502, and conveyor 505 should be operated at substantially the speed of belt 504, though obviously the speeds of the conveyors between which the spacer conveyor is disposed may run at speeds which are somewhat different from those of the spacer belts.

In the drawings, as particularly shown in FIG. 2, conveyor belt 505 is separate from belt 602 which runs through the keying station. Such would not be necessary if it were not for the necessity of directing the articles around a right angle turn in the system shown in FIG. 1. In other words, conveyor 505 could, if conditions of installation permitted, run on through the keying station. Conveyor belt 505 is of conventional construction. It is driven by any suitable drive mechanism.

From the foregoing description it will be apparent that the spacer will lend itself to use in any conveyor installation where it is necessary to space apart a succession of articles at least a certain minimum distance. It is merely necessary to insert the spacer conveyor between the head and tail ends of a pair of conveyors, and for maximum efficiency of operation have each such conveyor run at the speed of that spacer conveyor belt with which it is contiguous.

An object of the invention is the provision of an article spacing unit adapted to receive articles at its tail end and in conjunction with a conveyor to which it delivers articles from its head end space the articles apart, the spacer conveyor including a pair of conveyor sections driven at relatively different speeds with one section adapted to first receive the articles to be spaced and pass them on to a second conveyor operating at a greater speed with the difference in speeds giving rise to a spacing between the articles, and with a control system associated with the conveyor sections to insure proper spacing between articles and adapted to start and stop the first conveyor section in accordance with whether the articles are being properly spaced.

Other objects, advantages and meritorious features will more fully appear from the following specification, claim, and accompanying drawings, wherein:

FIG. 1 (sheet 1) is a plan view of an article distribution system including our article spacer;

FIGS. 2 and 3 (sheet 2) are respectively plan and side views of the article spacer system for positively spacing articles prior to entry upon the sorting span; and FIG. 4 (sheet 3) is a schematic wiring diagram of the control system for the spacer.

The spacer 500 shown in FIGS. 1, 2 and 3, may have utility in any conveyor system where it is desired to space apart or insure at least a determined minimum distance between successive articles traveling in either end abutting or randomly spaced relation. The spacer has been designed to be inserted as a unit between the head end of an accumulating conveyor 400 and the tail end of the keying station conveyor 602 and will serve to take articles from the head end of the one and space them, or insure their spacing, at least a predetermined minimum distance apart as they pass onto the tail end of the subsequent conveyor. To carry out the spacing function three conveyor belts are required, two of them comprising what may be termed the spacer conveyor and the third, though essential to the spacing operation, may be a conveyor belt having some function in addition to package spacing; for example, it may be the belt which carries packages through the keying station 600, or in the case of a sorter which diverts packages from only one side, it could be the sorting conveyor itself.

The spacer conveyor includes belts 502 and 504, the latter running faster than the former to open a "peak-a-boo" interval between packages moving from belt 502 to belt 504. The packages move with the "peak-a-boo" interval between them successively to the belt 505 which is a continuously operating belt. Considering FIGS. 2 and 3, as package Pa moves from belt 502 to belt 504 it is accelerated opening a gap between it and succeeding package Pb through which a light beam from lamp 506 may impinge upon electric eye PER 1. Package Pa is then carried on by the conveyor belt 505 to interrupt and pass through the light beam from lamp 508 impinging upon electric eye PER 2. The distance between these light beams determines package spacing effected by the spacer. If package Pa has not cleared the beam from lamp 508 before package Pb interrupts the beam from lamp 506, the belts 502 and 504 are immediately stopped automatically until Pa has cleared the beam from 508 and then the belts are restarted. The belts 502 and 504 are driven by a chain drive 510 and 512 entrained at one end over sprockets 513 of a motor-driven clutch and brake unit schematically shown at 514, and entrained at the opposite end over sprockets 518 and 520 connected to belt drive rolls 522 and 524. We have found that if belt 502 is operated at 110 feet per minute, and belt 504 at 150 feet per minute that very satisfactory spacing operations result. The sprockets are sized to provide the aforementioned belt speed differential. The motor driven brake and clutch unit 514 is of conventional construction and need not be described except to explain that it includes an electric motor operating sprockets 513 through an electric clutch with a brake provided to stop the sprockets when the clutch is disengaged. The brake is provided with a solenoid control switch for applying and releasing it, as is the clutch. The belts, and associated mechanism, are supported on a suitable framework 526.

The control system for the spacer is schematically shown in FIG. 4 and operates in the following fashion, it being understood that relay contacts and switches are shown in their normally open or normally closed positions which is their condition when a light beam is being interrupted. As a package interrupts the beam to PER 1, relay CR–A is energized. When the package leaves PER 1, CR–P is energized. This first package is now between light beams impinging upon PER 1 and PER 2. When a second package interrupts the beam impinging on PER 1, this causes an energization of CR–S. When relay CR–S is energized it causes the application of the brake and the release of the clutch. This stops belts 502 and 504 with the result that packages on the spacer conveyor are interrupted in movement. When the first package interrupts the light beam impinging on PER 2, the relay CR–B is energized. As the first package clears the beam, PER 2 energizes CR–R which in turn de-energizes relays CR–A, CR–P and CR–S. Relay CR–S causes a release of the brake and application of the clutch to start the belts 502 and 504 moving with the result that the second package follows the first with a gap therebetween determined by the distance between the beams. When relays CR–A, CR–P and CR–S are de-energized, relay CR–B is also de-energized which in turn de-energizes relay CR–R. The cycle is now ready to repeat. Of course if the packages are spaced farther apart than said gap as they enter upon the belt 505, the spacer belts 502 and 504 will not stop as will be evident from a study of FIG. 4.

For maximum efficiency of operation conveyor 400 should be operated at substantially the same speed as belt 502, and conveyor 505 should be operated at substantially the speed of belt 504, though obviously the speeds of the conveyors between which the spacer conveyor is disposed may run at speeds which are somewhat different from those of the spacer belts.

In the drawings, as particularly shown in FIG. 2, conveyor belt 505 is separate from belt 602 which runs through the keying station. Such would not be necessary if it were not for the necessity of directing the articles around a right angle turn in the system shown in FIG. 1. In other words, conveyor 505 could, if conditions of installation permitted, run on through the keying station. Conveyor belt 505 is of conventional construction. It is driven by any suitable drive mechanism.

From the foregoing description it will be apparent that the spacer will lend itself to use in any conveyor installation where it is necessary to space apart a succession of articles at least a certain minimum distance. It is merely necessary to insert the spacer conveyor between the head and tail ends of a pair of conveyors, and for maximum efficiency of operation have each such conveyor run at the speed of that spacer conveyor belt with which it is contiguous.

What is claimed is:

1. An article spacer for delivering and arranging articles in spaced relation on a conveyor comprising: a pair of conveyor spans arranged in end-to-end relation with means connected thereto for driving them in the same direction but at different speeds for opening a gap between articles moving from one span to the next with the higher speed span disposed to discharge articles received from the slower speed span on to the conveyor on which articles are to be arranged in said spaced apart relation, scanning means at the article transfer junction of the higher speed span and said conveyor for scanning across the junction and detecting the presence or absence of an article, a second scanning means arranged spaced along said conveyor from said article transfer junction for scanning across the conveyor and detecting the presence or absence of an article at such spaced location, and said scanners connected in a control circuit coupled to the drive means for starting and stopping the spans to space apart articles on the conveyor substantially equal to the distance between said scanners.

References Cited

UNITED STATES PATENTS 3,212,622    10/1965    Metz _____ 198—34

EDWARD A. SROKA, Primary Examiner

U.S. Cl. X.R.

250—223